Sept. 15, 1931.   D. GOOCH   1,823,828
WATCHMAKER'S AND ENGRAVER'S EYEGLASS HOLDER
Filed June 28, 1929
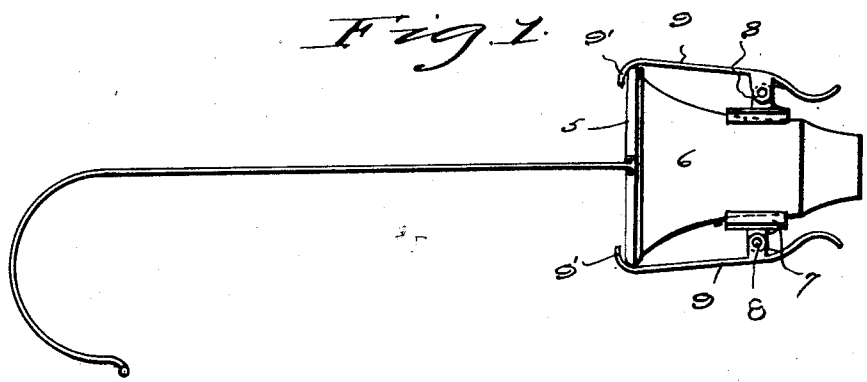
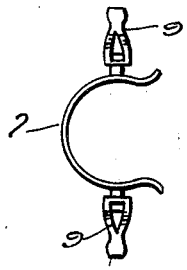
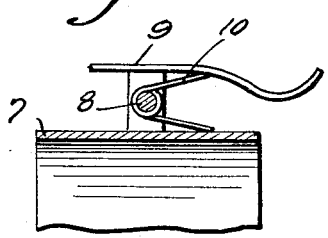
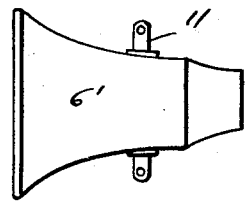
Inventor
Hennie Gooch
By Clarence A. O'Brien
Attorney Patented Sept. 15, 1931

1,823,828

UNITED STATES PATENT OFFICE

DENNIE GOOCH, OF SOMERSET, KENTUCKY

WATCHMAKER'S AND ENGRAVER'S EYEGLASS HOLDER

Application filed June 28, 1929. Serial No. 374,572.

The present invention relates to an eye glass holder and has for its primary object to provide means whereby a magnifying glass holder such as is used by watchmakers and engravers may be attached to ordinary eye glasses worn by the workman.

A still further very important object of the invention resides in the provision of attaching means of this nature which is exceedingly simple in its construction, inexpensive to manufacture, thoroughly efficient and reliable in use, and otherwise well adapted for the purpose for which it is designed.

In the drawings:

Figure 1 is a side elevation of a pair of eye glasses showing an engraver's or watchmaker's magnifying glass holder attached thereto, by my improved attaching means.

Figure 2 is an end elevation of the attaching means.

Figure 3 is a plan view of one of the jaws.

Figure 4 is a sectional view through the holder attaching means, and

Figure 5 is a side elevation of a watch maker and engraver's magnifying glass holder with studs projecting therefrom, Referring to the drawings in detail and first particularly to the embodiments shown in Figures 1 to 3 inclusive, it will be noted that the numeral 5 denotes the glass of an ordinary pair of spectacles and the numeral 6 a conventional watch maker and engraver's magnifying glass holder. Numeral 7 denotes a U-shaped clip adapted to be engaged over the holder 6 and having pivotally connected thereto as at 8, a pair of jaws 9 on opposite sides adjacent the ends, and springs 10 are associated with the pivot for normally holding the curved extremities 9' of the jaws in engagement with the eye glass 5.

In Figure 5 I have shown an embodiment doing away with the clip 7 by providing a pair of studs 11 on opposite sides of the holder 6' so that the jaws 9 may be pivoted directly thereto.

With this arrangement, it will be seen that it is easy to attach the watchmaker or engraver's magnifying glass holder to ordinary receptacle worn by the watch maker or engraver. Obviously the clip will fit practically any size holder and it can be removed at will and placed around any other holder when it is desired to do so. This attachment makes it possible to use any holder without the user removing his spectacles when the same are worn. This attachment will also fit any size spectacle lens.

It is thought that the construction, utility and advantages of this invention will now be quite apparent to those skilled in this art without a more detailed description thereof. The present embodiments of the invention have been disclosed in detail merely for the purposes of exemplification, since in actual practice, they attain the features of advantage enumerated as desirable in the statement of the invention and the above description.

It will be apparent that changes in the details of construction, and in the combination and arrangement of parts may be resorted to, without departing from the spirit or scope of the invention as hereinafter claimed or sacrificing any of its advantages.

What is claimed is:

1. The combination with a magnifying glass holder of means for attaching the holder to spectacle lens comprising a spring clip removably embracing the holder, spring pressed jaws pivotally mounted on the said clip and engageable with the spectacle lens for maintaining the said holder in position.

2. The combination with a magnifying glass holder of means for attaching the holder to spectacle lens comprising a spring clip removably embracing the holder, and spring pressed jaws pivotally mounted on the said clip and having curved extremities adapted to hook over the spectacle lens for maintaining the said holder in position.

3. A clamping device for attaching a watchmaker's magnifying glass holder to the lens of a pair of spectacles, comprising a U-shaped spring clip for embracing the holder, a pair of pivotally mounted jaws connected with the said clip on relatively opposite sides thereof, each of said jaws being bent at its opposite end to provide a lens engaging hook at its inner end and a finger grip at its outer end, and a tensioning spring associated with each jaw.

In testimony whereof I affix my signature.

DENNIE GOOCH.